June 17, 1924.　　　　　　　　　　1,497,859
A. C. LILLY
NAILHEAD WASHER
Filed June 19, 1923
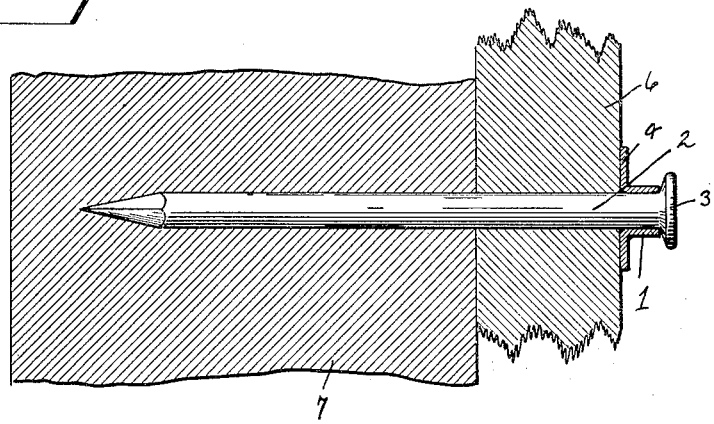
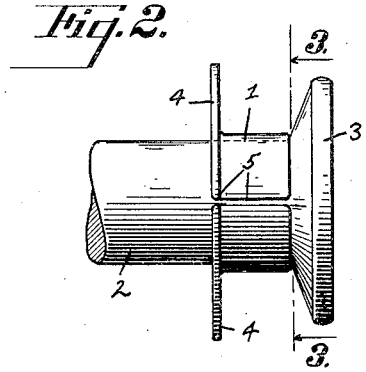
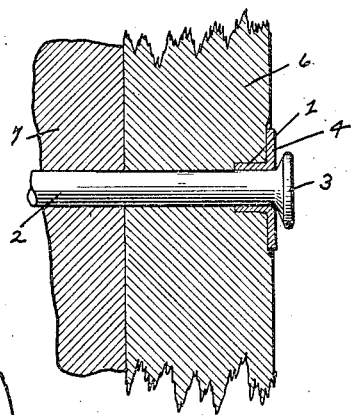
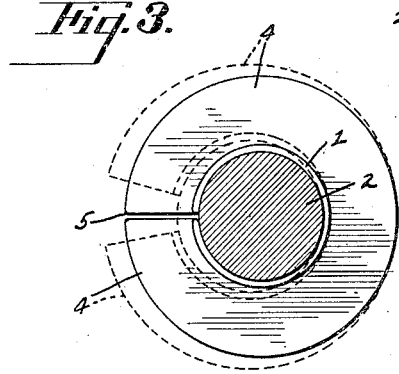
INVENTOR
ALLEN C. LILLY
BY
ATTY Patented June 17, 1924.

1,497,859

UNITED STATES PATENT OFFICE.

ALLEN C. LILLY, OF SEBASTOPOL, CALIFORNIA.

NAILHEAD WASHER.

Application filed June 19, 1923. Serial No. 646,464.

*To all whom it may concern:*

Be it known that I, ALLEN C. LILLY, a citizen of the United States, residing in the city of Sebastopol, and county of Sonoma, and State of California, have invented a new and useful Improvement in Improved Nailhead Washers, of which the following is a specification.

My invention relates to washers for nails and nail heads and the like whereby the movement of a nail into a surface may be limited and the head of the nail held in spaced relation to such surface when the nail is driven.

The primary object of my invention is to provide an improved washer adapted to engage the body and head of a nail to hold the head of the nail in spaced relation to a surface into which the nail is driven whereby the removal of the nail may be facilitated.

A further object is to provide an improved washer which is expandible to accommodate various sizes of nails.

Another object is to provide a device adapted to facilitate the removal of nails and to reduce injury to lumber in tearing down temporary structures.

A still further object is to provide a device of simple construction which may be manufactured at an extremely low cost and which may be used repeatedly in the erection of temporary structures.

I accomplish these and other objects by means of the device disclosed in the drawings forming a part of the present specification and drawings wherein like characters of reference are used to designate similar parts throughout said specification and drawings and in which, Fig. 1 is a sectional view showing the manner in which my improved washer is applied upon a nail driven to secure two pieces of material together.

Fig. 2 is an enlarged side elevation of the head of a nail showing my improved washer applied thereon.

Fig. 3 is a transverse sectional view taken upon line 3—3 of Fig. 2 in the direction indicated, and showing in dotted lines the manner in which the washer is expanded to receive a nail of greater diameter.

Fig. 4 is a section view showing another manner in which the washer may be applied to limit the movement of the nail into material into which it is driven.

In building operations of various kinds it is usually necessary to erect structures of a temporary nature such as concrete forms, scaffolds, and the like, such structures being torn down immediately after their purpose has been accomplished. Frequently such structures are of a rather extensive character and the tearing down involves a considerable expenditure of time and labor. Furthermore, the tearing down results in injury to the lumber due to the fact that the nails used in building the structure must be driven fast to obtain accurate alignment and sufficient rigidity to meet the usual requirements, the subsequent forcing apart of the lumber and the removal of the nails often causing damage to the lumber so great as to render the lumber useless for future construction.

To facilitate the removal of nails from such structures and to avoid waste of lumber I have devised an improved washer adapted to engage the head of a nail and hold said head in spaced relation to the surface into which the nail is driven.

Referring to the drawings, my improved washer will be seen to consist of a sleeve portion 1 adapted to fit over the body portion of a nail 2 and to engage the head 3 thereof. An annular flange 4 is formed upon one end of the sleeve portion 1, said flange extending outwardly at substantially right angles to the sleeve portion. The sleeve 1 and the flange 4 are split along one side thereof as at 5 to permit both portions to be expanded or contracted to fit various sizes of nails. The sleeve and flange are shaped together from a single piece of sheet metal or other suitable material.

In operation the sleeve is applied over the body of the nail with the flange 4 positioned away from the head 3. When now the nail is driven the flange 4 engages the surface into which the nail is driven and the head 3 of the nail abuts against the outer edge of the sleeve portion 1 and is thereby held in spaced relation to the flange 4 and the surface into which the nail is driven. At the same time the nail may be driven with sufficient force to draw and secure a piece of lumber in a desired relation to a supporting frame. Thus in Fig. 1 of the drawings, I have shown the manner in which a nail 2 may be driven through a piece of lumber 6 and into a supporting structure 7 to draw the piece 6 into firm engagement with the piece 7 and firmly hold the piece 5 in position, the head 3 of the nail being held in spaced relation to the piece 6 so that when it is desired to tear down the structure, a nail puller may readily be applied in back of the head 3 and the nail removed without material injury to the lumber; upon removal of the nail the washer is recovered and made available for use in future construction.

In Fig. 4 of the drawings I have shown a manner in which the washer may be applied upon the nail with the flange 4 adjacent the head 3 of the nail whereby the sleeve may be driven into the outer piece 6 and the flange 4 forced against the outer surface to increase the area against which the head of the nail is caused to bear. This manner of application is particularly useful in permanent construction to prevent the secured member from being forced outwardly over the head of the nail.

By splitting one side of the sleeve 1 and flange 4, the washer is made expandible to accommodate various sizes of nails. Thus a washer designed to fit one size of nail may readily be expanded to receive a number of larger sizes by simply driving the larger nail through the sleeve 1, the severed ends being spread outwardly as shown in dotted lines in Fig. 3 to admit the larger nail. An expanded washer may of course be again contracted to fit a smaller nail if desired.

Having thus described my invention what I claim as new and desire to secure by Letters Patent is—

1. A washer for nail heads comprising an expandible sleeve portion adapted to fit over the body portion of nails of different sizes and to engage the heads of such nails; and an expandible flange formed upon the sleeve to engage a surface into which a nail is driven and limit the movement of the nail into said surface.

2. A washer for nail heads comprising a sleeve portion adapted to fit over the body of a nail and to engage the head thereof; and an annular flange formed upon one end of the sleeve to engage a surface into which the nail is driven to limit the movement of said nail into the surface, the sleeve and flange being split upon one side thereof to permit expansion and contraction to accommodate nails of various sizes.

In witness whereof I hereunto set my signature.

ALLEN C. LILLY.